K. K. NIELSEN

July 19, 1932. CANDLE SOCKET Re. 18,535

Original Filed Jan. 28, 1927

Inventor:
Karl K. Nielsen
by Albert Scheible
Attorney

Reissued July 19, 1932 Re. 18,535

UNITED STATES PATENT OFFICE

KARL K. NIELSEN, OF CHICAGO, ILLINOIS, ASSIGNOR TO ALCOR MANUFACTURING COMPANY, OF CHICAGO, ILLINOIS, A CORPORATION OF ILLINOIS

CANDLE SOCKET

Original application filed January 28, 1927, Serial No. 164,165, Patent No. 1,690,693 dated November 6, 1928. Divided and application filed January 9, 1928, Serial No. 245,312, Patent No. 1,855,889, dated April 26, 1932. Application for reissue filed May 31, 1932, Serial No. 614,649.

My invention relates to lighting fixtures of the candle type, in which a socket for the lamp bulb is supported in the upper end of a tubular candle-simulating jacket by a support connected to a fixture at or near the lower end of this jacket, and in which the shell of the socket is insulated from this jacket by a tube of insulating material.

Generally speaking, my invention aims to provide a cheaply manufactured candle socket for this purpose which can readily be adjusted as to its length, which will permit the needed adjustment in length to be made accurately without the use of a rule, in which a single and accessibly positioned screw locks the adjustably connected parts against displacement, and in which the support for the socket also affords a convenient support for the socket-shell-insulating tube.

More particularly, my invention provides a socket support in which the main members consist of two slidably interfitting yoke-shaped members, in which graduations on a shank of one of these members indicate the effective total length of the appliance, in which simple formations on the shanks of the two yoke-shaped members cooperate with a single screw in keeping the shanks of the said two members parallel, and in which simple strut means associated with the screw prevent the fork arms from bending toward each other.

Furthermore, my invention provides a socket support of this general nature in which integral formations on one of the forked members suffice as supports for holding the insulating tube in its proper position.

Still further and more detailed objects will appear from the following specification and from the accompanying drawing, in which the lamp-socket construction includes insulating and rotation-preventing features more fully disclosed in my Patent No. 1,690,693 dated November 6, 1928, on a candle socket, of which my present application is a division.

Figure 3:
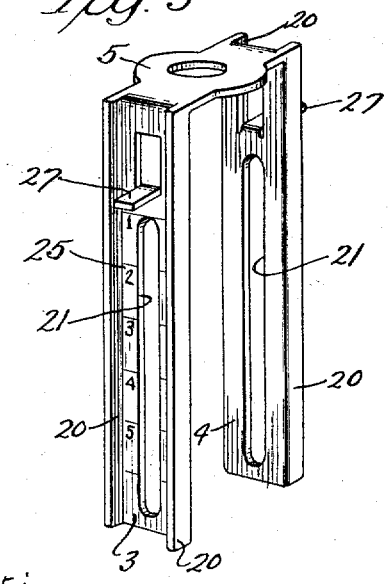
Fig. 3 is a perspective view of the upper yoke-shaped member of the support.

In the embodiment of the drawing, the candle socket of my invention includes a metal screw shell 1 threaded for receiving the base of an upright lamp bulb 2. This socket shell is supported by two parallel and downwardly directed metal shanks 3 and 4, which are suitably secured to and insulated from the said metal socket shell. To facilitate the securing of the metal socket shell to these upper shanks 3 and 4, I preferably connect them at their upper ends by a top 5 formed integral with these shanks as shown in Fig. 3, so that these shanks together with the top 5 constitute an upper yoke-shaped supporting member of inverted U-shape.

Figure 1:
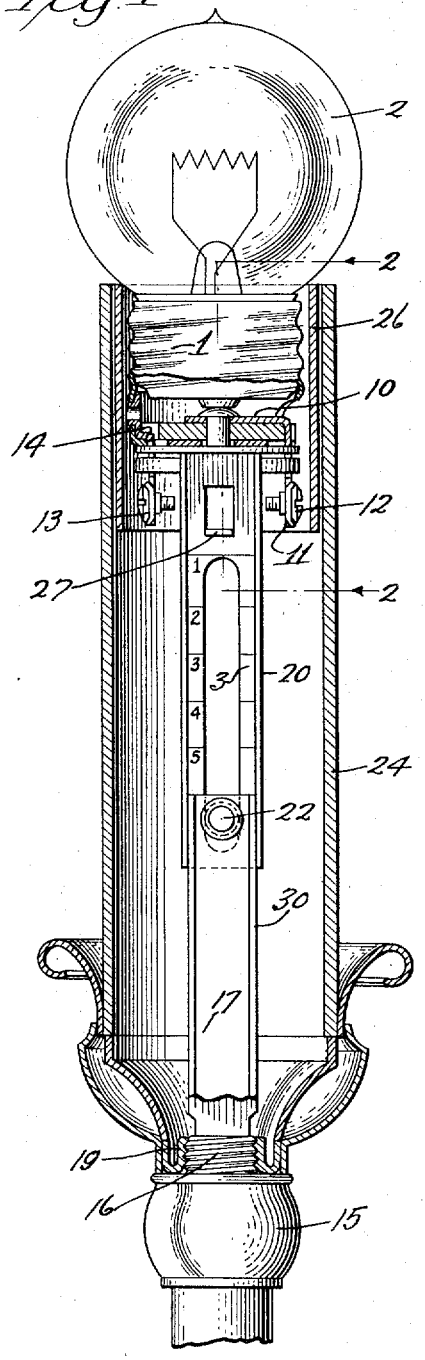
Figure 1 is a central, vertical and longitudinal section through a candle socket embodying my invention, showing this in connection with the lamp bulb and the usual adjacent fixture portions.
Figure 2:
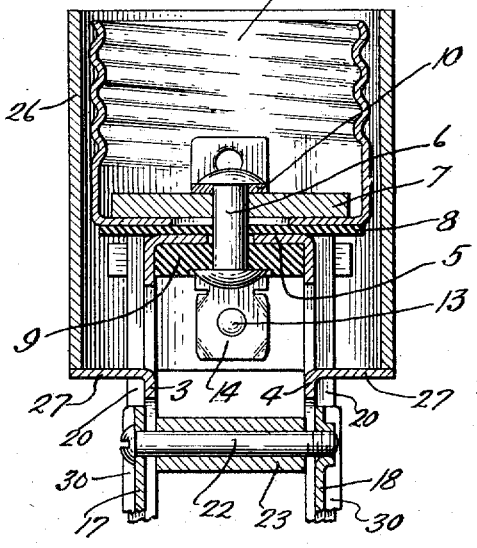
Fig. 2 is an enlarged central, vertical and longitudinal section taken through the socket and insulating tube of Fig. 1 and through the upper portion of the support, in a plane at right angles to Fig. 1, or along the line 2—2 of that figure.

The top or bight of this upper member is secured to the base of the socket shell 1 by a single rivet 6 which extends successively downward through alined perforations in an insulator 7 seated on the bottom of the socket shell, a second insulator 8 interposed between the bottom of the socket shell and the upper face of the said top or bight 5, the bight 5 of the upper supporting member, and an insulator 9 engaging the lower face of this bight. The same rivet 6 also extends through a metal strip arm 10 seated on the first named insulator 7 within the socket shell which arm forms part of a metal strip having another arm 11 extending freely downward through an opening in the socket shell (as shown in Fig. 1). Threaded through the depending arm 11 below the socket shell is a wire-clamping screw 12, so that the head of this screw together with the adjacent portion of the strip arm 11 afford a wire terminal disposed below the socket shell.

The companion wire terminal is formed by a screw 13 threaded through a metal strip 14 which is secured to the metal socket shell 1, and this companion wire terminal is desirably also slightly below the bottom of the socket shell.

To mount the above described assembly of a lamp socket and a pair of depending shanks on a fixture portion 15 which has the usual upwardly directed threaded nipple 16, I provide a second and relatively lower yoke-shaped supporting member consisting of two parallel shanks 17 and 18 and a bottom bight 19 which is threaded to fit the said nipple. The shanks of one of the two yoke-shaped or U-shaped members are spaced so that they will bear slidably against the outer faces of the shanks of the other U-shaped member, and means are provided for maintaining the axes of the said two members continuously parallel. For this latter purpose, I make the shanks of at least one member of a channel-shaped transverse section, preferably by providing webs on the member which fit inside the other. Thus, where the shanks of the upper supporting member are spaced by a less distance than those of the lower member, I provide each of the less widely spaced shanks 3 and 4 with outwardly directed longitudinal webs 20 spaced so as to engage opposite edges of the shanks (17 and 18) which respectively bear against the said shanks 3 and 4. Thus arranged, the rigid assembly (consisting of the lamp socket proper and the upper yoke-shaped supporting member) can readily be slid up or down upon the fixture-supported lower yoke-shaped member to vary the total length of the candle socket. To stiffen the structure, I desirably provide longitudinal edge flanges on the shanks of both members, as by providing webs 30 at the edges of the shanks 17 and 18, so that all four of the shanks are of a channel section.

To latch the two U-shaped supporting members in any adjusted position, I provide means for simultaneously clamping each shank of one of these supporting members to the adjacent shank of the other supporting member. For this purpose, I preferably provide longitudinal slots 21 in the inner (or more closely spaced) shanks 3 and 4. Then provide the other shanks 17 and 18 (preferably near their free ends) with alined perforations, one of which perforations has its bore threaded to fit a screw 22. By extending this screw freely through one of the said perforations and through the slots 21, and by threading the tip of the screw into the threaded perforation bore until the head of the screw engages the adjacent face of one of the outer shanks, I can draw the outer shanks 17 and 18 toward each other to clamp them respectively against the inner shanks 3 and 4.

However, with the thin metal (which is desirably employed for the sake of low cost, easy forming and lightness) such a tightening of the screw would cause the tips of the outer shanks to press the inner shanks toward each other, thereby vitiating the desired rigidity. To avoid this, I interpose a strut between the inner shanks 3 and 4 for rigidly spacing these, desirably by using a tube or sleeve 23 which houses the major portion of the screw 22 and is supported by the latter. By employing such a strut, I cause a tightening of the screw to clamp the overlapping shanks at each side of the support tightly against each other and against one end of the strut, thereby forming a rigid supporting structure.

A slight loosening of the screw 22 will release this clamping and permit the shanks of the upper supporting member to be slid up or down upon the shanks of the lower supporting member, thereby varying the effective length of the socket. Such an adjustment is needed for permitting the same supporting structure to be used in candle-simulating shells, such as tube 24, which usually is of an ivory tint. To facilitate an exact adjustment of the length of the support without requiring the use of a scale, I preferably mark graduations 25 on one shank of the inner forked member, these graduations being arranged as to be read along the end of the adjacent outer shank.

Since the candle-simulating tube 24 might be of poor insulating material, or even of metal, the underwriter's requirements demand an insulation between the bore of this tube and the metal socket shell 1. For this purpose, I provide an insulating tube 26 slid down over the said socket shell within the tube 24, and I support this insulating tube by fingers 27 projecting respectively from the shanks 3 and 4 of the upper supporting member and extending radially outward of that member, which fingers preferably are respectively integral with these shanks. These fingers 27 are preferably disposed below the wire terminals of which the screws 12 and 13 are portions, so that a suitably long insulating tube 26 will house these terminals as well as the metal socket shell.

Both of the supporting members can readily be stamped from sheet brass or the like, and the amount of material required is reduced to a minimum so that the entire structure as above described is low in cost. It also is obviously easy to assemble and to adjust as to its length; and because the structure is entirely open on two sides, conducting wires may be conveniently threaded through and connected to the wire terminals on the base of the socket.

However, while I have heretofore described my invention in an embodiment in which each pair of parallel shanks is connected by a bight to form an integral yoke-shaped or U-shaped supporting member, in which guide webs are formed upon both of the upper supporting members, and in which the strut is in the form of a tube through which the screw extends, I do not wish to be limited to these or other details of the construction and arrangement thus disclosed. Many changes may obviously be made without departing either from the spirit of my invention or from the appended claims, and I also do not wish to be limited to the employment of the various novel features of my invention in conjunction with one another. Neither do I wish to be limited to the use of my supporting structure in connection with the particular lamp-socket construction here illustrated.

I claim as my invention:

1. A support for an upright lamp socket, comprising an upper member of inverted U-shape secured at its top to the socket; a lower U-shaped member adapted to be secured to a fixture part and having its shanks slidably engaging the shanks of the upper member, the shanks of the upper member being provided with longitudinal slots; cooperating means spanning the shanks of both members for clamping each shank of one member firmly against the adjacent shank of the other member and for preventing an approach of the shanks at one side of the support to those at the other side of the support; one of the said members having a shank thereof provided with graduations whereby the end of the adjacent shank of the other member indicates the total length of the socket and support combination.

2. A support for an upright lamp socket, comprising an upper member of inverted U-shape secured at its top to the socket; a lower U-shaped member adapted to be secured to a fixture part and having its shanks parallel to the shanks of the other member with the shanks of one member respectively engaging the outer faces of the shanks of the other member, the shanks of one member being provided with longitudinal slots and the shanks of the other member each having a perforation alining with the slot in the adjacent shank of the other member; threaded means spanning the shanks of the two members and extending through the said slots and perforations for drawing the two outer shanks toward each other, and a strut interposed between the two inner shanks for rigidly spacing the latter shanks, the strut being supported by the threaded means.

3. A candle socket structure comprising an upright socket including a lamp-base receiving shell and a wire terminal disposed lower than the said shell; an upper supporting member of inverted U-shape secured at its top to the bottom of the socket, the said member having each shank provided with a longitudinal slot; a lower U-shaped supporting member having its shanks respectively slidably engaging the shanks of the upper member; means associated with the said two members for clamping each shank of one member rigidly to a shank of the other member; the upper member having on each shank a radially projecting arm below the said wire terminals; and an insulating tube seated on the said arms and housing both the said socket shell and the said wire terminals.

4. A candle socket structure comprising an upright socket including a metal shell for receiving the base of a lamp; a pair of parallel supporting shanks extending downwardly from the socket and each having an outwardly directed finger adjacent to the bottom of the said shell; a lower supporting member including a base portion adapted to be secured to a fixture and a pair of shanks respectively in slidable engagement with the first named shanks; means for rigidly securing each of the first named shanks to a shank of the lower supporting member; and an insulating tube housing the socket shell and seated upon the said fingers.

5. An electric candle socket comprising a screw shell, a shell support for said screw shell comprising a pair of parallel shell supporting arms, parallel with, overlapping and secured to the screw shell, a yoke shaped supporting member having a pair of arms adjustably mounted on the first mentioned pair of arms, one of said pair of arms being slotted longitudinally, and the other pair having oppositely disposed screw holes, a single screw extending through the screw holes and slots of all of the arms and having a head bearing against the outer face of one of the arms and threadedly connected with the other outer arm and a strut surrounding the screw and bearing against the inner faces of the inner arms.

6. An electric candle socket comprising a screw shell, a shell support composed of a pair of channel shaped, longitudinally slotted arms secured to and extending downward from said screw shell, a yoke shaped member having a pair of channel shaped arms, parallel with, fitting and slidably guided on the first mentioned pair of arms, said last mentioned arms having oppositely disposed screw holes, a single screw extending through the screw holes and slots of all of said arms with its head bearing against an outer one and threaded in an opposite outer one, and a strut surrounding said single screw and confined between the inner arms.

7. An electric candle socket comprising a screw shell, a shell support for said screw shell comprising a pair of parallel shell supporting arms secured to the screw shell, a yoke shaped supporting member having a pair of arms, parallel, and interfitting with and adjustably mounted on the first mentioned pair of arms, one of said pair of arms being slotted longitudinally, and the other pair of said arms having oppositely disposed screw holes, a single screw extending through the screw holes and slots of all of the arms and having a head bearing against the outer face of one of the outer arms and threadedly connected with the other outer arm and a sleeve surrounding the screw and bearing against the inner faces of the inner arms.

8. The combination of a lamp socket having a base, a pair of wire terminals secured to and depending from said base near diametrically opposite sides thereof, and an extensible support for the socket comprising an upper pair of spaced parallel arms secured to and depending from opposite sides of the socket at points spaced approximately 90° from said terminals, a lower pair of arms rigidly connected at their lower ends and having substantially the same spacing as the upper arms so as to form extensions thereof, a single screw for clamping the two sets of arms together so as to permit of endwise adjustment, said screw passing through both sets of arms, and a spacing member interposed between the innermost arms adjacent the screw, said arms having apertures therein to receive the screw and the apertures in one set of arms being in the form of elongated slots.

9. The combination of a lamp socket having two wire terminals adjacent opposite sides thereof and an extensible support for the socket comprising two pairs of spaced parallel arms, one of said pairs being secured to said socket in spaced relation to said terminals and depending from the socket to form an upper bracket section and the other pair of arms having at their lower ends an apertured connecting member so as to form a lower bracket section, corresponding arms of the two sections being engageable slidably with each other so as to constitute two extensible supporting bars spaced apart between which bars electric conductors entered through the apertured connecting member may extend for connection with said terminals, a single clamping screw for holding the two bracket sections in fixed relation, the arms of one section being slotted and the arms of the other section being perforated in alinement with the slots so as to receive the screw, and a strut interposed between the inner arms and cooperating with the screw in its clamping action, said arms being shaped so as to interengage with each other and prevent relative turning movement about the screw.

In testimony whereof, I have hereunto affixed my signature.

KARL K. NIELSEN.